UNITED STATES PATENT OFFICE.

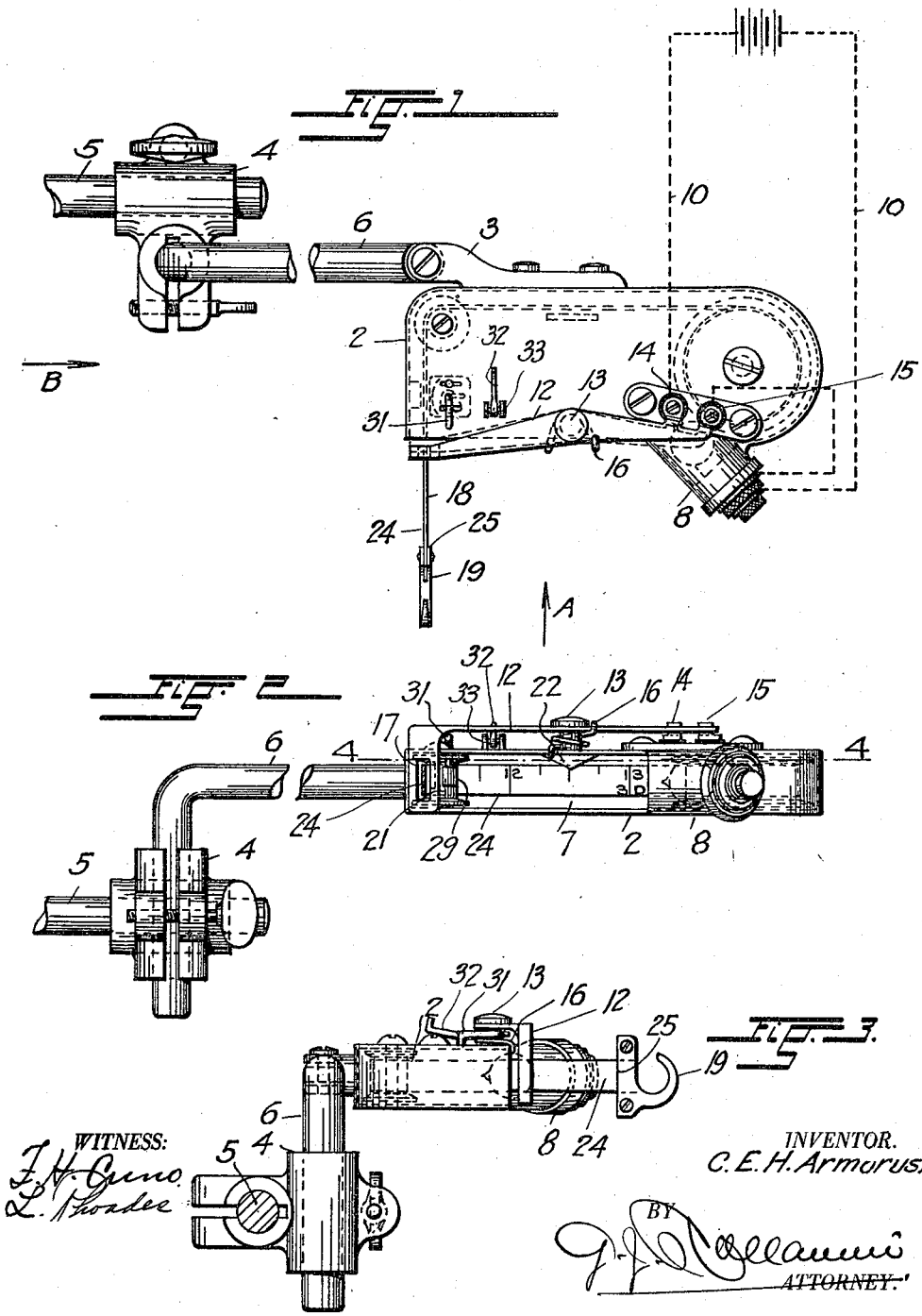

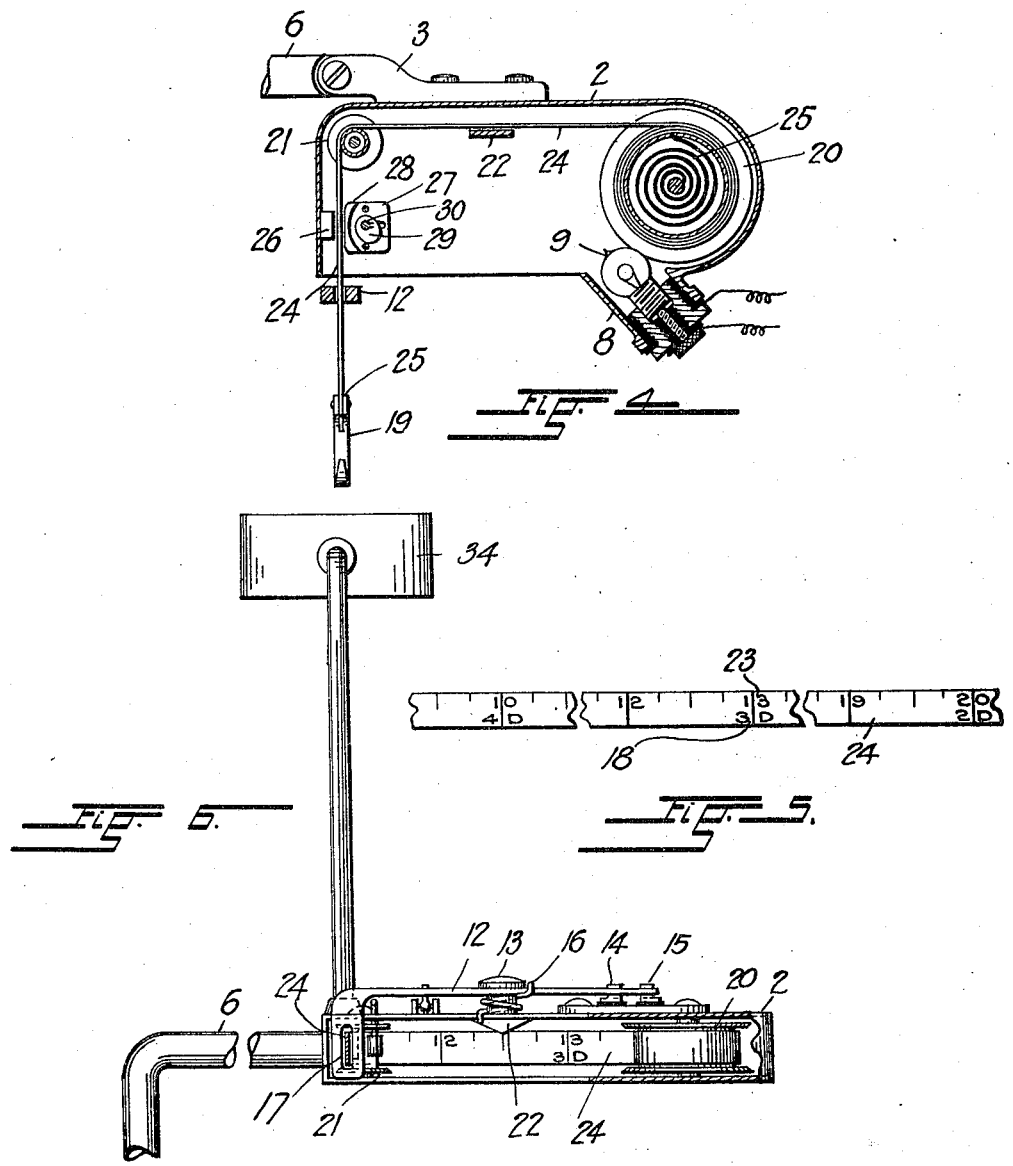

CHARLES E. H. ARMBRUSTER, OF DENVER, COLORADO.

MEASURING INSTRUMENT.

1,276,311.  Specification of Letters Patent.  Patented Aug. 20, 1918.

Application filed May 14, 1917. Serial No. 168,528.

*To all whom it may concern:*

Be it known that I, CHARLES E. H. ARMBRUSTER, a citizen of the United States, residing at Denver, in the county of Denver and State of Colorado, have invented certain new and useful Improvements in Measuring Instruments, of which the following is a specification.

This invention relates to measuring instruments and its primary object resides in providing an instrument of simple construction by which a measured distance between two points may be read at a glance with or without the assistance of an artificial light.

My invention is particularly adapted for the use of oculists and opticians in examining the eyes of a patient by means of a retinoscope, a test-type chart or other similar device employed to find the focusing point of the eye under examination.

With the above objects in view, my invention comprises a flexible measuring tape which is wound upon a spring reel and which for convenience bears in addition to a scale indicating inches and fractions thereof, a parallel scale giving the equivalents in dioptrics.

The reel is rotatably mounted on a holding appliance which carries a pointer to coöperate with the graduations on the measuring tape as it is unwound from the reel in the operation of the device.

The tape turns at an angle about a roller likewise mounted in the holding appliance, and the pointer is positioned between this roller and the reel to indicate the distance between a point at which the holding appliance is fastened and the free end of the tape, at the portion of the tape extending transversely to that which measures said distance by the separation of its end from the point at which the holding-appliance is positioned.

Inasmuch as retinoscopy is usually practised in a darkened room, an artificial light is used to illuminate the portion of the tape coöperating with the pointer, and for convenience in operation, a switch is connected in the circuit of the light to automatically close said circuit when the tape is being unwound from the reel.

The holding appliance on which the measuring tape is mounted as hereinbefore explained, is preferably fastened to a bracket, standard or other suitable support in adjacency to a trial frame which carries the lenses through which the patient focuses upon a distant object employed in the examination of the eyes.

When the trial-frame used in the test is supported upon the nose and ears of the patient, the holding appliance of the measuring tape, fastened to a support adjacent the seat occupied by the patient during the examination, may be provided with a rest to support the head of a patient in the proper position.

The tape is provided at its free end with a hook for its attachment to the retinoscope, test-chart or other device employed in the examination of the eyes, and a clamp is provided to lock the same at any desired point in case the device is to be retained at a determinate distance from the patient.

It will be understood from the above that when by movement of the testing device to which the end of the tape is attached, relative to the point at which the reel frame is fixed, the focusing point of the eye under examination is determined, the operator can without changing his position, read quickly and correctly the distance of the instrument from the patient and thereby determine the correction of a defect of the eye.

In the static method of retinoscopy, when the eye is at rest and focusing a distance of twenty feet or more, the measuring instrument is used to indicate the position of the artificial far-point produced between the patient and the operator, and, in brief, the instrument is of value in conducting any ocular test in which a distance measurement is required.

An illustrative embodiment of my invention has been shown in the accompanying drawings in the different views of which like reference characters designate similar parts and in which—

Figure 1 is a plan view of my improved measuring device in connection with a stationary support, Fig. 2, a face view of the same looking in the direction of the arrow A, Fig. 1, Fig. 3, an end view of the instrument looking in the direction of the arrow B, Fig. 1.

Fig. 4, a section taken along the line 4—4, Fig. 2,

Fig. 5, a fragmentary view of the tape used in the instrument, and

Fig. 6, a partially sectional front elevation of the instrument showing the application of a head rest thereto.

The reference character 2 designates a casing provided with an ear 3 for its attachment to a stationary support which in the drawings is shown to be composed of a clamp-collar 4 mounted upon a horizontally disposed rod 5.

The connection between the casing and the support is in the preferred construction shown in Figs. 1 to 3 established by a rod 6 which is adjustably fastened in the clamp 4 and pivotally connected with the ear 3 to permit of an adjustment of the casing to place it in the proper position with relation to the trial frame or the eye of the patient.

The casing is open at its face to provide a sight opening 7 through which the portion of the measuring tape registering with the pointer may be observed as will hereinafter be explained, and it carries at one end of said opening a tubular housing 8 for a small incandescent lamp 9.

The lamp illuminates the interior of the casing through an opening in the end of its housing and its circuit indicated by the broken lines 10 in Fig. 1, includes an automatic switch which as best shown in Figs. 1 and 2 is in its preferred form composed of a lever 12 fulcrumed as at 13 upon the casing and normally held in engagement with two contact-members 14 and 15 by a spring 16.

The contact members which are connected at opposite sides of a break in the circuit, are mounted on the casing in insulated relation to each other and they are electrically connected by the lever which bridges the space between them.

The arm of the lever opposite to that which engages the contacts, has a slot 17 for the passage of the measuring tape 24, with the object of maintaining it in a position separate from the contacts when the instrument is not in use, by the engagement of the hook at the end of the tape with the end of its arm as will hereinafter be more fully described.

A hook 32 pivoted on top of the casing as at 33 may be employed to hold the lever in a position in which it is separated from the contacts when it is desired to use the instrument without artificial light.

The spring-controlled reel 20 upon which the measuring tape is wound is mounted for rotation within the casing at the end thereof at which the contacts 14 and 15 are disposed.

The flanged roller 21 around which the tape turns at right angles, is mounted to rotate within the casing at the opposite end thereof and the pointer 22 which indicates the measurements by coöperation with the transversely extending portion of the graduated tape, is fastened in the casing between the roller and the reel.

The tape which is fastened at one of its ends to the reel, carries at its free end the hook 19 for its connection with the retinoscope, test-type chart or other testing device used in the examination of the eyes.

The tape has upon one of its faces, a scale 23 showing inches and fractions thereof, and a scale 18 showing the equivalents in dioptrics as shown in Fig. 5, and the hook at the free end thereof has a shoulder 25 to engage the end of the lever 12 when the instrument is not in use.

Inasmuch as the winding power of the spring 25 of the reel exceeds the rotative strength of the spring 16 which moves the lever into engagement with the contacts, the end of the lever opposite to that engaged by the hook on the tape will normally be separated from the contacts and thereby break the lamp circuit, as shown in broken lines in Fig. 1.

To hold the tape in position after it is partially unwound from the reel, a clamp is provided which in the construction shown in the drawings, comprises an abutment 26 and a slide 27 between which the tape passes before it enters the slot in the lever.

The slide has opposite the abutment, a shoulder 28 which coöperates therewith to clamp the tape and a cam 29 on a spindle 30 which extends through an opening in the top of the casing for connection with a thumb-piece 31, is adapted to move the slide toward the abutment by engagement with its shoulder.

In the construction shown in Fig. 6 of the drawings, the reference numeral 34 designates a head-rest adapted to support the head of a patient in the proper position when the instrument is used separate from the bracket trial-frame employed in testing the eyes.

The head-rest extends above the casing to which it is attached and includes a curved plate to engage the forehead of a patient looking across the stationary casing, at the operator who holds the end of the tape.

When the casing is fastened to the support in a substantially horizontal position, the operator can readily observe the portion of the tape exposed between the reel and the roller, through the sight opening in its face.

After the testing device is fastened to the hook of the tape and the latter is partially unwound from the reel, the switch automatically moves to its closing position and thus closes the circuit which causes the incandescence of the lamp. The operator is thus enabled to read the graduations on the tape registering with the pointer, at a considerable distance and while the room in which the examination is made is in darkness, and the annoyance and errors resulting from the present method of reading the distance between the patient and the operator by examining the extended portion of the tape are thus entirely avoided.

Having thus described my instrument in the best form at present known to me, it will be understood that variations in the construction and arrangement of its parts may be resorted to within the spirit of my invention as defined in the following claims:

1. A measuring instrument of the character described comprising a holder, a measuring tape wound thereon, guiding means causing a portion of the tape to extend in a determinate direction as it is unwound, and another portion to extend at an angle to said direction, and a pointer coöperating with the first-mentioned portion of the tape.

2. A measuring instrument of the character described comprising a holder, a measuring tape wound thereon, guiding means causing a portion of the tape to extend in a determinate direction as it is unwound, and another portion to extend at an angle to said direction, a pointer coöperating with the first-mentioned portion of the tape, an electric lamp disposed on the holder to illuminate the portion of the tape coöperating with the pointer, and a switch operated by movement of the tape and controlling the current flow to the lamp.

3. A measuring instrument of the character described comprising a holder, a measuring tape wound thereon, guiding means causing a portion of the tape to extend in a determinate direction as it is unwound, and another portion to extend at an angle to said direction, a pointer coöperating with the first-mentioned portion of the tape, and a device at the free end of the tape for its connection with a retinoscope or the like.

4. A measuring instrument of the character described comprising a holding-appliance, a spring-controlled reel thereon, a measuring-tape wound on said reel, guiding means causing a portion of the tape to extend in a determinate direction as it is unwound and another portion to extend at an angle to said direction, and a pointer on said appliance coöperating with the first-mentioned portion of the tape.

5. A measuring instrument of the character described comprising a holder, a measuring tape wound thereon, guiding means causing a portion of the tape to extend in a determinate direction as it is unwound, and another portion to extend at an angle to said direction, a pointer coöperating with the first-mentioned portion of the tape, an electric lamp to illuminate the portion of the tape coöperating with the pointer, a switch for controlling the current-flow to the lamp, including a spring-pressed contact-lever, and a shouldered device on the tape, engaging said lever to move the switch to an open position when the tape is rewound.

6. A measuring instrument of the character described comprising a holder, a measuring tape wound thereon, guiding means causing a portion of the tape to extend in a determinate direction as it is unwound, and another portion to extend at an angle to said direction, a pointer coöperating with the first-mentioned portion of the tape, an electric lamp to illuminate the portion of the tape coöperating with the pointer, a switch for controlling the current-flow to the lamp, including a spring-pressed contact-lever, and a hook at the free end of the tape, adapted to engage said lever and thereby move the switch to an open position when the tape is rewound.

7. A measuring instrument of the character described comprising a holder, a measuring tape wound thereon, guiding means causing a portion of the tape to extend in a determinate direction as it is unwound, and another portion to extend at an angle to said direction, a pointer coöperating with the first-mentioned portion of the tape, an electric lamp to illuminate the portion of the tape coöperating with the pointer, a switch for controlling the current-flow to the lamp, including a spring-pressed contact-lever, a shouldered device on the tape, engaging said lever to move the switch to an open position when the tape is rewound, and means independent of said device for locking the lever in the position it occupies when the switch is open.

8. A measuring instrument of the character described comprising a holder, a measuring tape wound thereon, guiding means causing a portion of the tape to extend in a determinate direction as it is unwound, and another portion to extend at an angle to said direction, a pointer coöperating with the first-mentioned portion of the tape, and means for locking the tape in a partially or completely unwound condition.

9. In combination, a stationary holder, a winding measuring tape thereon, means guiding the tape for movement in a determinate direction with relation to the holder, and a rest on the holder for supporting the head of a patient in a position in which he faces in the direction of said movement.

In testimony whereof I have affixed my signature in presence of two witnesses.

CHARLES E. H. ARMBRUSTER.

Witnesses:
G. J. ROLLANDET,
L. RHOADES.